United States Patent [19]
Heitzman et al.

[11] Patent Number: 4,716,458
[45] Date of Patent: Dec. 29, 1987

[54] DRIVER-VEHICLE BEHAVIOR DISPLAY APPARATUS

[76] Inventors: Edward F. Heitzman; Edward J. Heitzman, both of 6 Moores Mill Rd., Pennington, N.J. 08534

[21] Appl. No.: 22,754

[22] Filed: Mar. 6, 1987

[51] Int. Cl.[4] .............................................. H04N 7/18
[52] U.S. Cl. ..................................... 358/103; 340/97
[58] Field of Search ............... 358/103, 104, 250, 93, 358/22; 340/980, 705, 97; 434/43, 62

[56] References Cited

U.S. PATENT DOCUMENTS 3,668,622  6/1972  Gannett et al. ................. 358/103 X
4,411,079  12/1983  Georges et al. ................ 358/104 X Primary Examiner—James J. Groody
Assistant Examiner—Victor R. Kostak
Attorney, Agent, or Firm—Plevy & Gittes

[57] ABSTRACT

Driver-vehicle behavior display apparatus is provided wherein data representing a vehicle's performance capability envelope and a polar plot of forces imposed by a driver on a vehicle are superimposed in real time upon video information representing a driver's view of roadway being traversed. In addition, bar graph information corresponding to accelerator position and brake pressure may also be provided and superimposed upon such video information. The resulting video signal may be viewed directly, transmitted to a remote viewing station, or recorded in a conventional VCR.

26 Claims, 7 Drawing Figures

DRIVER-VEHICLE BEHAVIOR DISPLAY APPARATUS

BACKGROUND

This invention relates to driver-vehicle display apparatus and more particularly to video display apparatus for relating a driver's actions to a vehicle's performance capabilities in real time superimposed upon the driver's view of the roadway ahead and the present steering wheel position.

The tire performance envelope, friction circle or g—g diagram concept as the same has been variously referred to, was developed by Calspan Corporation in the late '60's as a simple way of graphically demonstrating the performance of a given driver in a given vehicle during a single maneuver. While the concept of the tire performance envelope, friction circle or g—g diagram is best explained in the paper entitled "Measuring Car-Driver Interaction With The g—g Diagram," by R. S. Rice, Vehicle Reseach Dept., Calspan Corporation, as published at the International Automotive Engineering Congress conducted in Detroit, Mich. on Jan. 8–12, 1973 as Paper 730018 by the Society of Automotive Engineers, the same is based upon a recognition that the forces available to a driver in controlling a vehicle are derived at the tire-roadway interface. Therefore, by proper application of the brake, throttle, and steering device, and only through these devices, the driver of a vehicle can utilize the forces which are developed at the tire-roadway interface (contact patch) to produce vehicle motions in performing specific maneuvers. The fundamental constraint upon the system is, however, found in the tire-road coefficient of friction at the tire contact patch and hence regardless of a driver's ability, unlimited capability is not present for the taking. Thus, the tire-roadway performance parameter represents a maximum boundary on the g—g diagram which, when surpassed, results in a loss of control.

The tire performance envelope, friction circle or g—g diagram concept simply assumes that the maximum force that can be generated by the tire is independent of direction and that the magnitude is equal to the normal force times the sliding friction coefficient. While not strictly true, assuming that a tire has relatively equal traction capabilities in any direction, i.e. acceleration, braking, or cornering in either a right or left direction, results in a plot in the form of a circle or ellipse which depicts the outer limit of a vehicle's capability. If these are exceeded, a loss of control results. Thus, such a circle may be characterized as a performance envelope corresponding to the capabilities of a vehicle. In typical cases this performance envelope for street vehicles will have a radius which corresponds to the vector acceleration magnitude in g units corresponding to 0.7 g's.

If this performance envelope is plotted symmetrically on an X and Y axis, g force due to left cornering may be indicated from the zero location where the ordinate and abscissa intersect along the abscissa in a positive direction. G forces associated with right cornering may be indicated from the zero location along the abscissa in the left direction. Conversely, braking force may be indicated along the ordinate from the zero location in the upward direction while g forces due to acceleration may be located along the ordinate from the zero location in a negative direction.

The g forces imposed on a vehicle by a driver's action in applying the brake, throttle and steering wheel in performing a given maneuver may then be plotted on the same axis to provide a direct comparison of the manner in which the driver utilizes the vehicle's capabilities in performing the maneuver. Examples of how this may be done and uses therefor are set forth within the article entitled "What's It Really Like Out There?" by Paul Van Valkenberg as published in Road and Track Magazine, Oct. 1983, pages 67–69. Application of the g—g diagram to training race drivers is also described in the article entitled "How To Go Faster" by Bert Levy, published in Sports Car Magazine, October 1985 at pages 70–73.

While the concept of the g—g diagram or friction circle concept is extremely useful in training race car drivers and for assisting engineers in evaluating performance characteristics of various vehicles, its uses to data have been highly limited and frequently difficult since in each case the vehicle under test must be equipped with a computer capable of monitoring g force accelerometers for braking, acceleration and left and right cornering. Typically a strip chart recorder is employed to print out the g forces monitored as a result of a specific maneuver or those which occur as a result of a series of maneuvers. The resulting strip chart then must be interpreted by a skilled technician in terms of the actual maneuver performed and the events recorded analyzed in light of the precise events which occurred during the course of that maneuver as well as the performance envelope of the vehicle. This is not only difficult but often presents the data to a user in such a manner that correlation to real time and to the maneuver being conducted is so onerous as to preclude full utilization and understanding of the data obtained.

Therefore, it is a principal object of the present invention to provide improved driver-vehicle behavior display apparatus.

A further object of the present invention is to provide video g—g diagram display apparatus presenting driver's actions in real time in terms of a polar plot of g force imposed by a driver on a vehicle superimposed upon a vehicle performance envelope.

Another object of the present invention is to provide video g—g diagram display apparatus for relating a driver's actions to a vehicle's performance capabilities on a real time basis superimposed upon a driver's view of the roadway being traversed.

Another object of the present invention is to provide video g—g diagram display apparatus for relating driver's actions to vehicle performance capabilities on a real time basis superimposed upon a driver's view of the roadway and the steering wheel position.

A further object of the present invention is to provide video g—g diagram display apparatus for relating a driver's action to a vehicle's performance capabilities on a real time basis superimposed upon a driver's view of the roadway being traversed and a bar graph indicating throttle and brake engagment.

Various other objects and advantages of the present invention will become clear from the following detailed description of an exemplary embodiment thereof and the novel features will be particularly pointed out in conjunction with the claims appended hereto.

SUMMARY OF THE INVENTION

In accordance with the teachings of the present invention, driver vehicle display apparatus is provided wherein data representing a vehicle's performance capability envelope and a polar plot of forces imposed by a driver on a vehicle are superimposed in real time upon video information representing a driver's view of roadway being traversed.

BRIEF DESCRIPTION OF THE DRAWINGS

The invention will be more clearly understood by reference to the following detailed description of an exemplary embodiment thereof in conjunction with the accompanying drawings in which.

DETAILED DESCRIPTION

As originally developed, the conventional friction circle of g—g diagram was a continuous plot of a vehicle's horizontal acceleration vector during a given test or series of maneuvers which illustrated, on a strip chart recorder or the like, the portion of the vehicle's performance utilized by a driver in conjunction with the limits of the vehicle's capabilities. This is highly useful in training race car drivers and the like since the greater the portion of the vehicle's capabilities employed by the driver the faster the maneuver may be completed so long as the vehicle's capability is not exceeded at which time a loss of control will result. The same factors are highly important in enabling engineers to evaluate the performance capabilities of newly designed vehicles in testing for the performance characteristics of any vehicle and in performing skid pad tests in the generalized testing of vehicles. Key limitations of the conventional g—g diagram are its failure to describe the driving task being performed, the details of the driver's actions employed in attaining the recorded performance or to provide a real time correlation between these events and the recorded data. The instant invention therefore seeks to provide an instantaneous, real time, comprehensive display of vehicle-driver performance which can be readily analyzed by a driver.

Figure 1:
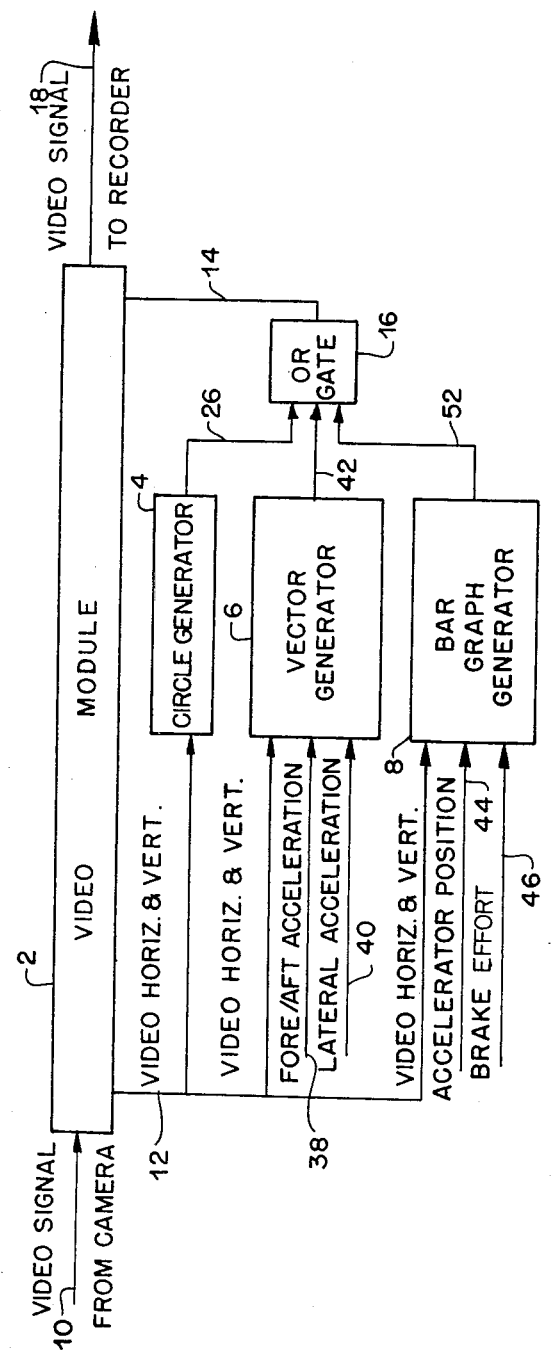
FIG. 1 is a block diagram serving to schematically illustrate a preferred embodiment of the driver-vehicle display behavior apparatus in accordance with the teachings of the instant invention.

Referring now to the drawings, and more particularly to FIG. 1 thereof, there is shown a block diagram serving to schematically illustrate a preferred embodiment of the driver-vehicle behavior display apparatus in accordance with the teachings of the instant invention. The embodiment of the driver-vehicle behavior display apparatus illustrated in FIG. 1 comprises a Video Module 2, a Circle Generator 4, a Vector Generator 6 and a Bar Graph Generator 8.

Figure 2A:
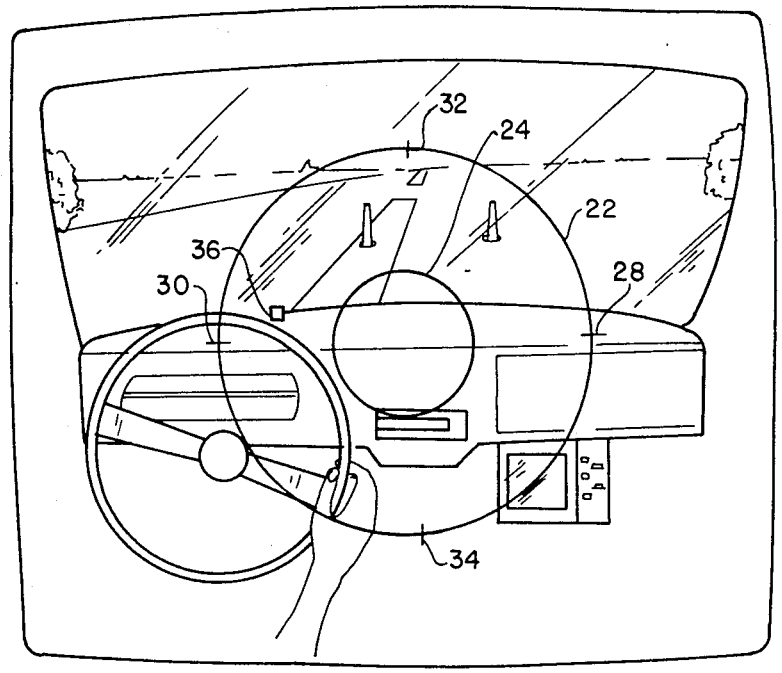
FIGS. 2a and 2b are representations of exemplary video g—g diagrams obtained in accordance with the teachings of the instant invention wherein in the representation of FIG. 2a conditions which may obtain during a "Right" cornering maneuver are depicted and no Bar Graph representation is provided while in the representation of FIG. 2b conditions which may obtain during a "Left" cornering maneuver are illustrated together with an exemplary Bar Graph representation.
Figure 2B:
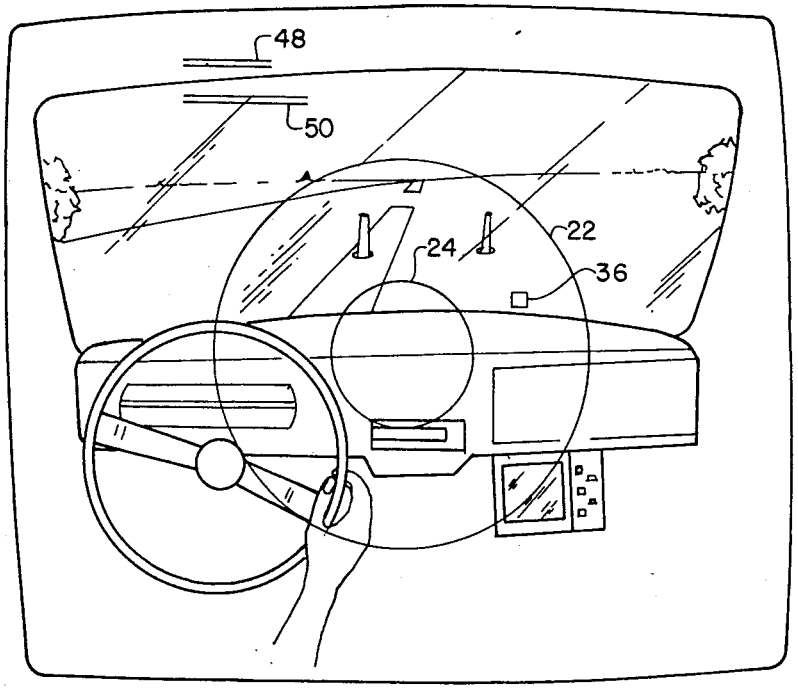

The Video Module 2 receives a video camera input as indicated on cable 10. The video camera input on cable 10 may take any of the conventional forms of outputs provided by conventional video camera apparatus compatible with NTSC video signal formats as currently employed within the United States. The camera providing the video camera input on conductor 10 as shall be appreciated in connection with FIGS. 2a and 2b is preferably positioned in a vehicle under test behind the driver at a location where the driver's view through the front windshield, together with the position of the steering wheel as operated by the driver, may be recorded together with any statements made by the driver or sounds occurring during the test being conducted. Thus, the video camera input on cable 10, as will be readily appreciated by those of ordinary skill in the art, will provide a conventional composite video signal to the Video Module 2 in the same manner as a video camera input would be provided to a conventional video tape recorder, monitor or the like.

The Video Module is described in greater detail in connection with FIG. 5. Here, however, it is sufficient to appreciate that the video Module 2 includes a video signal amplifier, sync separator and mixer and acts to provide horizontal and vertical sync pulses at the outputs thereto indicated on cable 12. These horizontal and vertical sync pulses in turn are applied to the Circle Generator 4, the Vector Generator 6 and the Bar Graph Generator 8 for timing and synchronism purposes, described below.

With respect to the video camera information provided on input cable 10, the Video Module 2 acts to condition the same and thereafter to form a composite video signal by combining the same with information additionally supplied to the Video Module 2 in digital form on the cable 14. The inputs provided to the Video Module 2 on cable 14 are digital in format and are developed, as shall be seen below, by the OR gate 16 as a result of any output generated by the Circle Generator 4, the Vector Generator 6 or the Bar Graph Generator 8. Thus, in essence, when no logical One output (white level) is provided by the OR gate 16 on cable 14, the output of the Video Module 2 on cable 18 will correspond to the video signal on cable 10 after the same has been suitably gain controlled, clamped and scaled by the Video Module 2. However, whenever a logic 1 is present on the cable 14, the video signal will be modified to incorporate that white level in the composite video signal produced on the cable 18. In modifying the video signal from a video camera on cable 10, the Video Module 2 acts in a manner to be described in connection with FIG. 5 to gain control the signal, clamp it to a reference and scale the same forcing its maximum (white) signal to be approximately equal to a logic 1 level and its minimum video (black) signal to be approcimately equal to a 0 logic level. Any signal present on the cable 14 is provided to the Video Module 2 as an overlay input and hence any logic 1 level present will force the video output of the Video Module 2 on cable 18 to a white 1 level causing information output by the OR gate 16 to be superimposed on the composite video signal produced.

The Circle Generator 4 is described in greater detail in connection with FIG. 3. Here, however, it is sufficient to appreciate that the Circle Generator 4 acts in response to horizontal and vertical sync signals generated by the Video Module 2 and provided on cable 12 to superimpose a friction circle or the like on the video signal supplied on cable 10 to the video module 18. Thus, for instance, referring to FIG. 2a it will be seen that there is shown a representation of an exemplary video g—g diagram obtained in accordance with the teachings of the instant invention. As will now be appreciated by those of ordinary skill in the art, the representation shown in FIG. 2a will correspond to the output of the Video Module 2 on cable 18 when the same is applied to a conventional monitor either directly from the Video Module 2 or after the same has been recorded and is being played back.

An inspection of FIG. 2a will readily reveal that the video signal from the camera positioned behind the driver of the test vechile will capture, as indicated, the driver's eye view of the roadway, the position of the steering wheel, and here a portion of the driver's right arm and shoulder as well as indicated portions of the dashboard of the vehicle. Superimposed upon this information are a pair of concentric circles 22 and 24. Both of these circles 22 and 24 are generated by the circle generator 4 in response to the horizontal and vertical sync signals supplied thereto on cable 12. This is done, as shall be seen in greater detail, in connection with FIG. 3 by dedicating each of the 64k bit positions within a read only memory to the approximately corresponding number of pixel positions in a section of the video frame. The pixel locations wherein a circle is displayed have 1's written into the memory while other locations have zeros written therein. Effectively, one bit is read from the Circle Generator 4 for each column and row of interest on the display and applied through the conductor 26 in FIG. 1 to the OR gate 16. The OR gate 16 may take any of the conventional forms of this well known class of device and acts to provide a high at the output thereof on conductor 14 when any of the inputs thereto are high. Therefore, when a 1 is read from the Circle Generator 4 in response to a particular row and column positio on the display, a 1 will be output by the OR gate 16 on cable 14 and result in a white level being output by the Video Module 2 on cable 18 for the particular row and column position.

In FIG. 2a the two concentric circles 22 and 24 have respective row and column positions on the display corresponding to row and column positions in a read only memory present within the Circle Generator 4 which have 1's written therein. The outer circle 22 represents the friction circle for the vehicle under test so that a maneuver initiated by the driver which creates g forces exceeding the boundary of the circle 22 will result in a loss of control of the vehicle. Thus, for instance, if an ordinate and abscissa are envisioned as superimposed upon the pair of concentric circles 22 and 24 having a central position disposed at the center of the circles 22 and 24, the location where the abscissa intersects circle 22 to the right of the ordinate is indicative of the maximum g force to which the vehicle may be subjected during a left cornering maneuver before a loss of friction and hence sideways skidding to the right will occur. This point on the friction diagram is generally indicated by the location annotated 28. Conversely, during a right cornering maneuver, loss of control is indicated on the friction circle 22 by location 30. A loss of control due to braking such as the point where the brakes lock would similarly be indicated where the ordinate meets friction circle 22 at location 32. A loss of control due to excessive acceleration would be represented by the lower intersection of the ordinate with the friction circle 22 as indicated by the location 34.

In viewing the locations 28-34 marked on the friction circle 22 it should be noted that the same correspond in direction to the g forces on the vehicle. Thus, for instance, in a hard left cornering maneuver, i.e. a hard left turn with no acceleration or braking, the driver partially illustrated in FIG. 2a would tend to be thrown by the g forces established from the center location of the circles 22 and 24 towards location 28.

Conversely in a hard right cornering maneuver, i.e. a right turn with zero acceleration and braking, the driver located at the intersection of the ordinate and abscissa would be thrown toward the location marked 30. For a pure braking maneuver the g forces would tend to throw the driver located at the center of the circles 22 and 24 toward location 32. In a pure acceleration maneuver ("pedal to the metal" and wheel straight) the driver located at the ordinate location would be thrown towards the location 34. For any combination of two of these maneuvers some interim portion on the friction circle 22 is apposite for indicating the point at which control is lost.

As explained in the foregoing articles, a vehicle's limiting horizontal acceleration may be represented by a circle or ellipse which is usually flattened in the pure acceleration direction (270°) by the vehicle's limited engine torque and this is especially so in the higher gears. In the pure braking direction the vehicle is limited by incipient skidding and in the pure cornering by tires and suspension design. Each of these points may be determined experimentally and then an appropriate friction curve for that vehicle generated by fairing a curve between these conditions, i.e. the locations marked 28, 30, 32 and 34 in FIG. 2a. Alternatively, vehicle performance may be measured under a sufficient number of test conditions to generate an actual curve.

As an alternative, one or more constant acceleration circles can be generated for use as scaling references. In FIG. 2a and FIG. 2b the friction curve indicated by 22 is estimated by a constant 0.7 g curve. This has been found to be sufficiently accurate for most conventional vehicles. However, those of ordinary skill in the art will appreciate that due to the technique of mapping the desired circle in ROM, any actual, empirical or assumed friction circle may be utilized. The circle 24 or inner circle corresponds to a 0.3 g circle and is representative of a psychological comfort limit circle within which operation of the vehicle by most drivers would be found to be comfortable.

Thus, the function of the Circle Generator 4 is to superimpose the concentric circles 22 and 24 on the composite video signal provided by the Video Module 2 on the output conductor 18.

The Vector Generator 6 is explained in greater detail in connection with FIG. 4. Here it is sufficient to appreciate that the Vector Generator 6 acts to generate a digital representation corresponding to the actual g forces imposed on the vehicle under test by a driver and to superimpose a representation thereof on the composite video signal in the manner indicated by the rectangle 36 in FIG. 2a.

The Vector Generator 6 receives horizontal and vertical sync signals from the Video Module through the cable 12 as indicated. In addition, the Video Generator 6 receives fore and aft acceleration signals indicative of the braking and acceleration (g's) imposed upon the vehicle through the cable 38 as indicated in FIG. 1. The fore and aft g force signals applied on cable 38 are generated, in a manner to be described in greater detail in connection with FIG. 4, by appropriately positioned accelerometers in the vehicle under test and the signals from the accelerometers are digitized. Since the magnitude of these signals will manifest themselves along the ordinate in terms of row location, they are compared against the present row position of the display and output when the signal magnitude and the row correspond.

Similarly, lateral acceleration signals from appropriately positioned left and right lateral accelerometers are provided through the cable 40 to the Vector Generator 6. These signals are digitized and then compared to the current column location of the display and output when the magnitude of the lateral g force corresponds to the current column position of the display. The g force vectors as thus resolved in accordance with the position of the display are stretched so that a suitably sized indication is provided and anded by the Vector Generator 6. The resultant output is supplied through the cable 42 as a logic 1 to the OR gate 16 and through the cable 14 to the Video Module 2 where the same is inserted as a white level on the video signal output on conductor 18. Thus, as illustrated in FIG. 2a, a rectangle 36 is impressed upon the composite white signal indicative of the current g forces imposed on the vehicle by the driver through the use of the steering wheel, throttle and brake.

For instance, as indicated in FIG. 2a, the vehicle under test is experiencing a current force vector as indicated by the rectangle 36 which specifies that the vehicle is in a right turn maneuver under minor braking force but experiencing a 0.6 g lateral acceleration due to the right cornering maneuver. This is well within the friction curve indicated by the circle 22 but outside of the comfort curve indicated by the circle 24. In the representation of FIG. 2b where corresponding reference numerals 22, 24 and 36 have been employed to designate the same indications as illustrated in FIG. 2a it will be seen that the vehicle under test is involved in a left cornering maneuver and experiencing again a 0.5 g lateral force due to the cornering maneuver; however, the force is in the opposite direction from that illustrated in FIG. 2a. Here too, slightly more braking effort has been applied then was present in connection with the maneuver shown in FIG. 2a. However, the maneuver taking place is well within the limits established by the friction curve 22.

The Bar Graph Generator 8 is optional but may be employed to enhance the video g—g diagrams obtained in accordance with the teachings of the instant invention. The Bar Graph Generator 8 will be explained in greater detail in connection with FIG. 6 of the instant application. Here it is sufficient to appreciate that the Bar Graph Generator 8 receives horizontal and vertical sync information through the multiconductor cable 12 from the Video Module 2. In addition, accelerator position information and brake effort or position information is supplied through multiconductor cables 44 and 46. In essence, and in a manner which shall be seen in greater detail in FIG. 6, accelerator position information and brake pressure transducer information supplied on the cables 44 and 46 are digitized and compared to the current column of the display to obtain an appropriate force magnitude indication. A separate Bar Graph associated with the accelerator position information on conductor 44 and the brake effort indicated on the conductor 46 is then superimposed on the video display at a convenient location. For instance, as illustrated in FIG. 2b, rows 0 through 12 of the display are employed wherein a 2 line bar graph indicating accelerator position is set forth on horizontal lines 2 and 3, a 6 line space is provided and a 2 line bar graph indicative of brake effort is provided on lines 10 and 11. Thus, an exemplary throttle input bar graph 48 is illustrated in FIG. 2b while bar graph 50 indicates an exemplary brake input.

Returning now to FIG. 1, the output of the Bar Graph Generator 8 is applied through the cable 52 to the OR gate 16 and from the OR gate 16 through the cable 14 to the input of the Video Module 2. As will be seen upon an inspection of FIG. 2b the Bar Graph Generator 8 provides a logic 1 output on conductor 52 for the number of columns in rows 2 and 3 and 10 and 11 of the display corresponding respectively to the position of the accelerator and forced imposed upon the brake. This increases the utility of the system by indicating to a viewer of the data the throttle and brake pressure present. Thus, with this added feature all driver inputs, steering, throttle and brake pressure are visible along with the g forces imposed on the vehicle compared to the capability of the vehicle and all of this is superimposed on the driver's view through the front windshield.

The preferred embodiment of the driver vehicle behavior display apparatus illustrated in FIG. 1 may be employed with or without the Bar Graph Generator 8. When the same is utilized without the Bar Graph Generator 8 the representation of the exemplary video g—g diagram illustrated in FIG. 2a is obtained. Here an observer of the display is presented with a friction circle 22 corresponding to the vehicle's capability, a comfort circle 24 corresponding to an ordinary driver's comfort level and a vector representation 36 representing the g forces imposed on the vehicle by the maneuver being carried out. The conditions associated with the maneuver are readily visible through the windshield image on the display as is the position of the steering wheel for the maneuver being carried out.

FIG. 2b illustrates the nature of the display obtained when a Bar Graph Generator 8 is employed. Here, all of the information presented in FIG. 2a is retained. In addition bar representations 48 and 50 corresponding to the accelerator position and brake pressure applied when the data associated with the vector representation 36 was obtained are also permitted. Thus, here, all of the driver initiated inputs, i.e. steering wheel position, accelerator position and brake pressure are viewable together with a vector representation 36 of the g forces imposed by the driver on the vehicle. These g forces are readily comparable to the capabilities of the vehicle as represented by the friction circle 22 and the conditions perceived by the driver are readily viewable through the windshield of the vehicle. The information illustrated in the video g—g diagrams represented in FIGS. 2a and 2b could be provided on a monitor in the vehicle for use in testing; however, for purposes of training race drivers and the like such data is preferably analyzed after the driver has run the test vehicle through preliminary sets of maneuvers.

Figure 3:
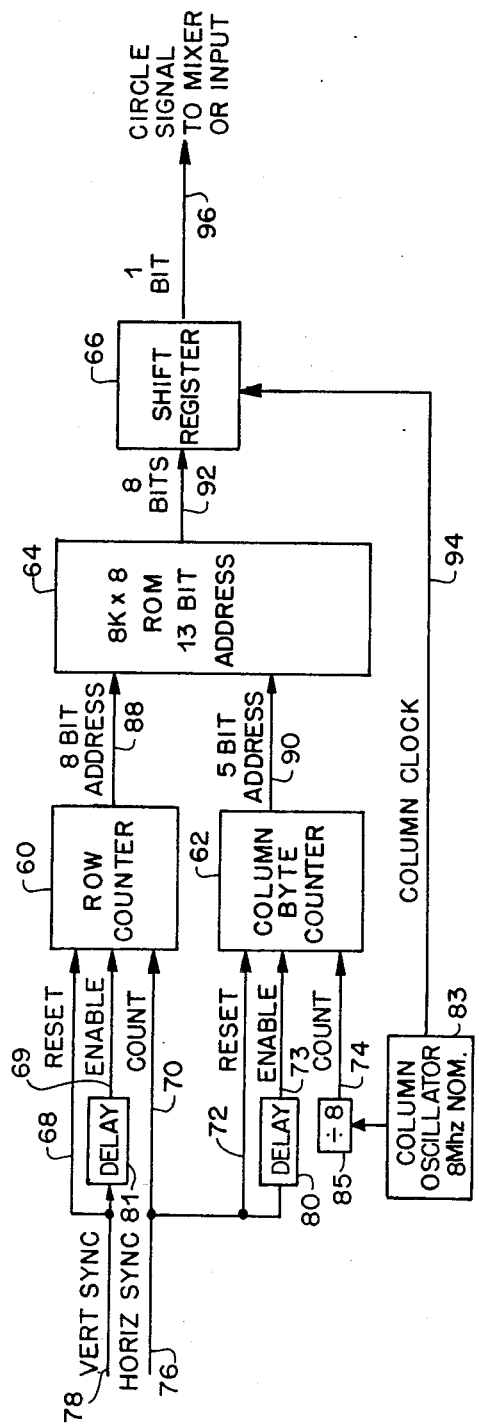
FIG. 3 is a block diagram serving to schematically illustrate an exemplary embodiment of a Circle Generator suitable for use in the embodiment of the invention illustrated in FIG. 1.

Referring now to FIG. 3 there is shown a block diagram serving to schematically illustrate an exemplary embodiment of a Circle Generator suitable for use in the embodiment of the invention illustrated in FIG. 1. The embodiment of the Circle Generator illustrated in FIG. 3 comprises a row counter 60, a column counter 62, a read only memory 64 and a shift register 66.

Both the row counter 60 and the column counter 62 may take the form of a dual 4 bit binary counter such as a 74HC4520 as available from RCA. In the case of the row counter 60, the dual 4 bit binary counter is configured as an 8 bit counter while in the case of the column counter 62 only 6 bits are employed wherein the top 5 bits are configured from the 74HC4520 chip while the 6th bit is a flip-flop which may be formed from one half of a 74HC74 dual-D flip-flop such as available from National Semiconductor. The 6th bit serves to prevent the column counter from overflowing during the line.

A reset, enable and count input is provided to the row counter 60 through the conductors 68-70 respectively while corresponding reset, enable and count inputs are provided to the column counter 62 on the conductors 72-74. Each of the counters 60 and 62 once reset by a pulse present on conductors 68 or 72 respectively will act in the well known manner to count pulses provided at the count inputs thereto on conductors 70 and 74 once the same are enabled by an appropriate input on the enable inputs thereto connected to conductors 69 and 73.

Figure 4:
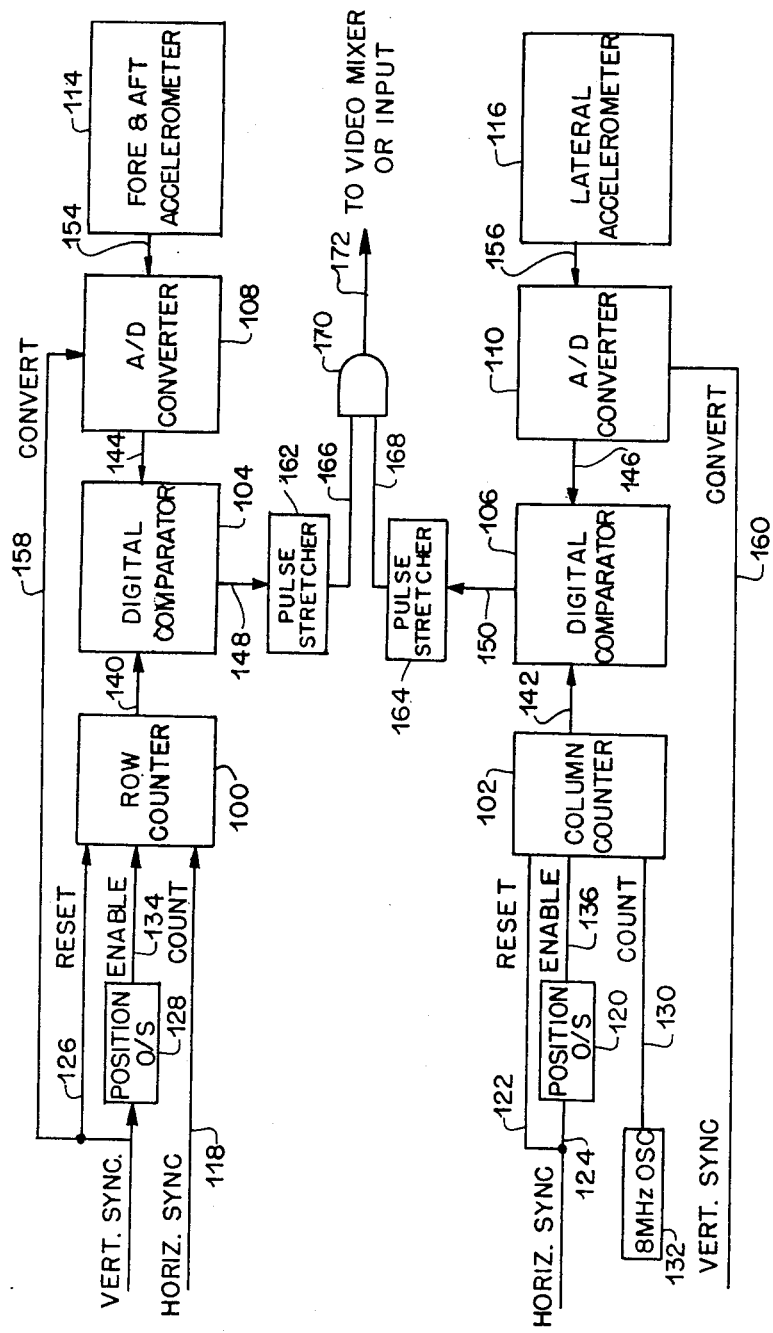
FIG. 4 is a block diagram serving to schematically illustrate an exemplary embodiment of a Vector Generator suitable for use in the embodiment of the invention shown in FIG. 1.
Figure 6:
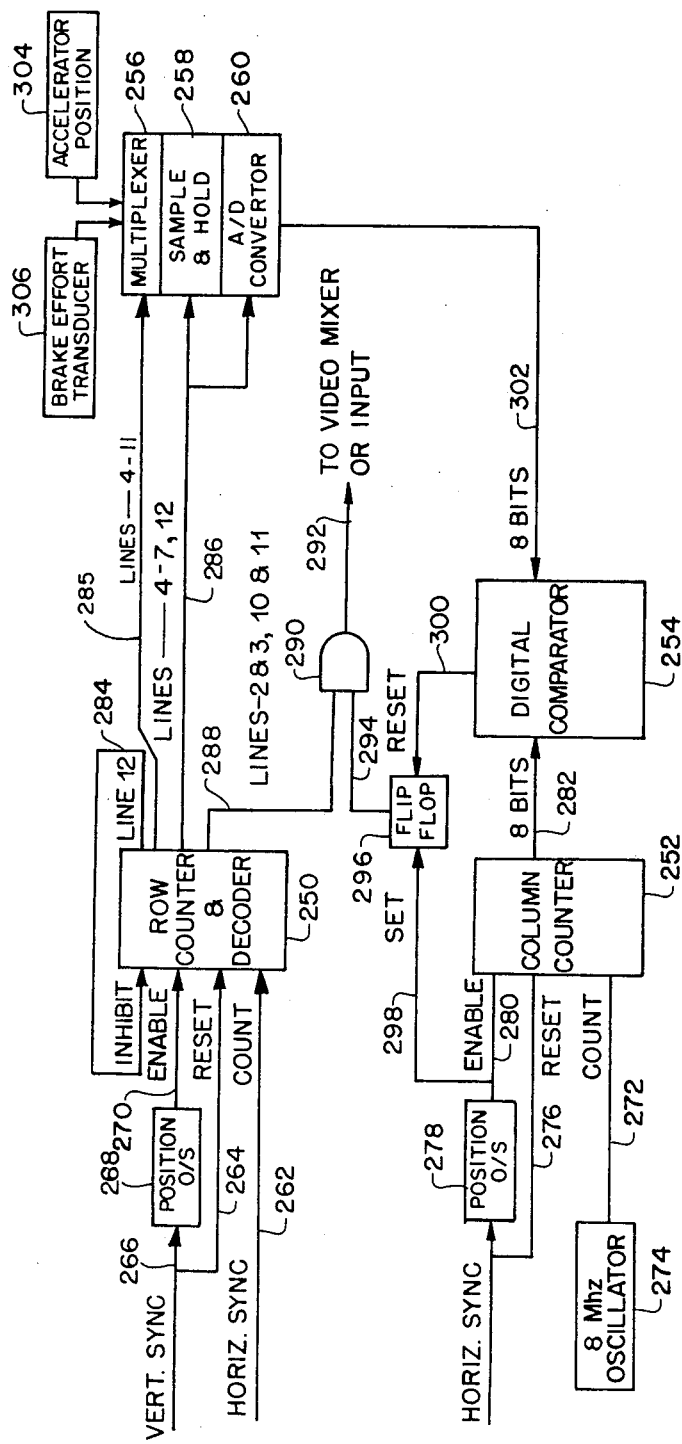
FIG. 6 is a block diagram of an exemplary Bar Graph Generator suitable for use in the embodiment of the invention shown in FIG. 1.

The configuration of the row and column counters 60 and 62, together with the inputs thereto, are employed in the embodiment of the Circle Generator illustrated in FIG. 3 as well as similarly in the Vector Generator illustrated in FIG. 4 and the Bar Graph Generator illustrated in FIG. 6 to establish 160 by 256 grid or matrix in which 160 horizontal scan lines of the video field are the horizontal lines or rows and a nominal 8.5 megahertz oscillator generates 256 vertical lines or columns. The row and column counters are inhibited by adjustable one shots 80 and 81 in the form of delays which are triggered by the vertical and horizontal sync pulses respectively so that the grid may be moved vertically and horizontally on the screen. The grid height is fixed since the counted video horizontal sync pulses are at a constant frequency while the grid width is adjustable by varying the column oscillator frequency. An average television picture has approximately 240 visible horizontal lines; however, the present embodiment of the instant invention employs only 160 of these lines to effect a pleasing visual appearance. Those of ordinary skill in the art will appreciate that a greater or lesser number of lines may be utilized as circumstances warrant.

In the case of the Circle Generator illustrated in FIG. 3, vertical sync and horizontal sync pulses are applied from the Video Module 2 through the cable 12 as indicated in FIG. 1 and received on the conductors 76 and 78 illustrated in FIG. 3. The horizontal sync pulses applied to conductor 76 are applied directly to the count input of the row counter 60 while the same are applied to the reset input on conductor 72 and the delay 80 associated with the column counter 62. Conversely, the vertical sync pulse on conductor 78 is applied directly to the reset input on conductor 68 of the row counter 60 while it is also applied to the delay 81 associated with the row counter 60. The count pulse for the column counter 62 is obtained from the output of a nominal 8.5 megahertz oscillator 83 whose output is divided by a counter 85. Thus, the row counter 60 is placed in a reset condition each time the once per frame vertical sync is provided while the column counter 62 is reset each time the horizontal sync pulse is provided at the beginning of each row.

The delays 80 and 81 may take the form of conventional one shots. For instance each delay may be formed by one half of a 74HC221 dual one shot as available from National Semiconductor. In the case of the row counter 60, once the same is reset by the vertical sync pulse present on conductors 78 and 68, the same will begin counting horizontal sync pulses on conductors 76 and 77 as soon as it is enabled. The same vertical sync pulse on conductor 78 which resets the row counter 60 also acts to set the delay 81 and hence will cause the row counter 60 to be enabled by the trailing edge of the pulse produced by the one shot 81.

Since there are normally 240 horizontal lines or rows on an average television picture and it is desired to form a 160 by 256 grid or matrix, the function of the delay 81 is to prevent the enabling of the row counter 60 until such time as approximately 50 horizontal sync pulses have occurred on conductor 76. Therefore, the duration of the delay 81 will be 50 times 60 microseconds so that the row counter 60 is enabled upon the appearance of the 51st horizontal sync pulse.

Under these circumstances the grid or matrix being generated will have approximately 160 horizontal lines or rows which are adjustable as a function of the setting of the timeout duration for the one shot delay 81. Once enabled, each horizontal sync pulse applied to the conductors 76 and 70 will be counted by the row counter 60 and an 8 bit address indicative of the state of the row counter 60 will be produced on the cable 88. The purpose of the 8 bit address on the cable 88, as shall be seen below, is to address one of the 256 rows within the ROM 64. Since the row counter 60 is reset once each frame by the vertical sync pulse present on conductor 78 and subsequently enabled after approximately 50 horizontal sync pulses have been generated on conductor 76, row counter 60 will count approximately 160 horizontal sync pulses per frame. The grid height is always fixed because the counted horizontal sync pulses occur at a constant frequency. The additional horizontal lines outside the grid established will be at the bottom of the screen and of no concern.

Conversely, since the grid to be established is 256 columns wide, the column counter 62 is reset upon the appearance of the horizontal sync pulse at the beginning of each horizontal row due to the presence of the horizontal sync pulse on conductors 76 and 72. After a short delay inserted by the one shot 80 which may typically correspond to 10 microseconds, the column counter 62 is enabled. The count input to the column counter 62 on conductor 74 is supplied from the column oscillator 83 which has a nominal 8.5 megahertz output, as aforesaid, after the same has been divided by 8. Thus, those of ordinary skill in the art will appreciate that 256 columns pulses, having a width of 32 microseconds, is framed within the 45-52 microsecond visible screen width. The column oscillator 83 may take the conventional form of an RC and NAND gate Schmitt trigger formed by a 74HC132 guad 2 input NAND Schmitt trigger such as available from National Semiconductor. The divide by 8 counter 85 may take the form of a conventional 3 bit counter utilizing the lowest 3 bits within a 74HC4520 dual 4 bit counter such as available from RCA. This, of course, represents the unused portion of the column counter 62. The output of the column counter 62 on cable 90 will comprise 5 bits in parallel and is employed to address each of the 32 columns within ROM 64.

The ROM 64 may take the conventional form of an 8k by 8 read only memory device such as a 27C64 EPROM which is available from National Semiconductor. Within the ROM the friction limit circle 22 and the comfort circle 24 illustrated in FIG. 2a is bit mapped onto the video grid by writing ones into each bit position wherein the limit circle or comfort circle is to appear. Those of ordinary skill in the art will appreciate that an 8k by 8 bit ROM will provide one bit location for a 256 by 256 matrix and hence the entire screen display may be mapped therein. Here, however, as aforesaid, a grid of 160 by 256 is utilized and hence only these bit positions within the ROM 64 are employed.

In actuality, the ROM 64 is addressed as having 256 rows of which only 160 are employed by the 8 bit address provided by the row counter 60 on the cable 88 and as having 32 columns by the 5 bit address supplied by the column counter 62 on the cable 90. Under these circumstances, the output of the ROM 64 on cable 92 will be 8 bits wide.

The 8 bit wide output of the ROM 64 on cable 92 is applied to the shift register 66. The shift register 66 may take the form of a conventional parallel-in/serial-out shift register such as a 75HC166 8 bit parallel-in/serial-out shift register such as available from National Semiconductor. The shift input to the shift register 66 is supplied through the conductor 94 to an output of the oscillator 83 which has a 8.5 megahertz nominal output as aforesaid. The shift register 66 acts in the conventional manner to receive each 8 bit byte supplied from the ROM 64 on the cable 94 and to shift the same to the output thereof connected to conductor 96 at a rate determined by the clock input supplied to the shift register on conductor 94. Thus, the 8 bit wide output entered into the parallel-in/serial-out shift register 66 is shifted out serially at the column frequency established by the column oscillator 83. Accordingly, use of the shift register 66 changes the memory from an 8k by 8 to a 64k by 1 memory and reduces its access time by a factor of 8 so that its access time becomes compatible with the 8 megahertz column clock 83.

The memory row address as supplied by the row counter 60 is updated at a grid row frequency of 15,750 hertz corresponding to the video horizontal frequency while the memory column address generated by the column counter 62 is updated at one eighth the grid column frequency. The output of the shift register 66 on the conductor 96 is applied to the OR gate 16 illustrated in FIG. 1 for further application through the conductor 14 to the video module 2. In the output of the shift register 66 a 1 will be present for each location in the grid or matrix established wherein the friction circle 22 or the comfort circle 24 is to exist and in fact will have a one to one relationship with each pixel in the display.

Referring now to FIG. 4 there is shown a block diagram serving to schematically illustrate an exemplary embodiment of a Vector Generator suitable for use in the embodiment of the invention illustrated in FIG. 1. The embodiment of the Vector Generator illustrated in FIG. 4 comprises row and column counters 100 and 102, digital comparators 104 and 106, A-D converters 108 and 110 and accelerometers 114 and 116.

The row and column counters 100 and 102 are employed in the same manner described in connection with the Circle Generator illustrated in FIG. 4 to establish an appropriate 160 by 256 grid or matrix for the information to be generated by the Vector Generator illustrated in FIG. 4. This is done in precisely the same manner described in connection with FIG. 3 with the signal exception that in FIG. 3 columns within the read only memory 64 were addressed as 32-8 bit bites to achieve 256 columns whereas in FIG. 4, as well as in the exemplary Bar Graph Generator illustrated in FIG. 6, columns are counted directly. Hence an 8 bit output is utilized for the column counter 102.

More particularly, both the row and column counters 100 and 102 may be formed by 8 bit counter chips such as a 74HC4520 as available from RCA and employed for the row and column counters 60 and 62 illustrated in FIG. 3. Both the row counter 100 and the column counter 102 receive horizontal sync pulses generated by the Video Module 2 and supplied thereto on the cable 12 together with vertical sync pulses.

The horizontal sync pulses are applied to the count input of the row counter 100 through the conductor 118 while the same are applied to the reset input of the column counter 102 and to a position one shot 120 through the conductors 122 and 124.

Conversely, vertical sync pulses obtained from the Video Module are applied directly to the reset input of the row counter 100 through the conductor 126 and to a position one shot 128. Count pulses for the column counter 102 are applied to the count input thereof through the conductor 130 from an 8.5 nominal megahertz oscillator which may take the same form as the oscillator 83 in FIG. 3. While not illustrated in FIG. 4, the column counter is provided with an additional bit or 9th bit in the form of a flip-flop in precisely the same manner described in connection the column counter in FIG. 3, again to prevent overflow.

The operation of the row and column counters 100 and 102 is precisely the same as was described in connection with FIG. 3. Thus the row counter 100 is reset by the once per frame video sync signal applied on conductor 126 while the column counter 102 is reset for each horizontal line by the horizontal sync pulse which appears on the conductor 122. Once reset the row counter 100 will begin counting horizontal sync pulses applied to the count input thereof on conductor 118 as soon as the same is enabled by a trailing edge applied to the enabled input thereto on conductor 134 by the position one shot 128. The position one shot 128 may take the same form of one shot as described in connection with the delay 81 illustrated in FIG. 3 and in fact may be configured as one half of a 74HC221 dual one shot chip such as available from National Semiconductor Corporation. The timeout duration of the position one shot 128 is also adjustable and is set for precisely the same interval as was described in connection with the delay one shot 81 in FIG. 3 so that effectively the row counter 100, once reset, is enabled by the trailing edge of the pulse generated by the position one shot 128. This occurs after the same number of rows indicated by uncounted horizontal sync pulses have been skipped so that of the 240 rows available, a grid having some 160 lines is formed.

Similarly, the column counter 102 is reset by a horizontal sync pulse on the conductor 122 and begins to count oscillator pulses on the conductor 130 as soon as the same is enabled by a trailing edge generated on conductor 136 at the completion of the duty cycle of the position one shot 120. The position one shot 120 is triggered as indicated by the presence of a horizontal sync pulse on the conductor 124. As was described in connection with FIG. 3 the one shot 120 may take the form of one half of a 74HC221 dual one shot which has had its timeout duration adjusted for a 10 microsecond delay or the like. This will appropriately establish a delay so that the 256 column block is centered horizontally on the video picture. The 8 bit parallel output of the row conductor 100 is supplied through the 8 bit cable 140 in parallel to the digital converter 104 while the 8 bit output of the column counter 102 is applied through the 8 bit cable 142 to the digital comparator 106.

The digital comparators 104 and 106 may each comprise 8 bit digital comparators such as 74HC688 8 bit magnitude comparator chips as available from National Semiconductor. Each of the digital comparators 104 and 106 act in the conventional manner to compare the 8 bits supplied in parallel thereto on cables 140 and 142 with 8 bits supplied in parallel thereto on cables 144 and 146. An output on the conductors 148 and 150 is provided whenever a comparison condition is obtained.

The 8 bit digital input supplied to comparator 104 on conductor 145 is generated by an A-D converter 108. The A-D converter receives an input on the cable 154 from the accelerometer 114. The accelerometer 114 is positioned in the vehicle in the fore-aft direction. Any conventional accelerometer devices such as those available from Kistler Corporation may be employed.

The fore/aft accelerometer 114 will provide an analog signal on the cable 154 corresponding to the instantaneous acceleration measured. This signal is transformed by the analog to digital converter 108 in the manner well known to those of ordinary skill in the art into 8 bits of parallel information whenever the analog to digital converter 104 is gated on by a convert signal supplied thereto through the conductor 158. As the convert signal on the conductor 158 is generated by the vertical sync, those of ordinary skill in the art will appreciate that the acceleration information provided to the A-D converter 108 on the cable 154 will be converted into 8 bits of digital information once per frame and supplied as 8 bits of parallel information to the digital comparator through the 8 bit cable 144.

Thus, once per video frame an 8 bit signal corresponding to the location of the fore/aft acceleration along the ordinate will be applied to the digital comparator 104 on the 8 bit cable 144. While not shown, the fore/aft acceleration information provided by the accelerometer on the cables 154 may be subject to conventional scaling techniques so that the full range of analog signals generated thereby will fit within the 160 line grid formed. When the digital representation of the actual fore/aft acceleration imposed on the vehicle by the driver's action as present on the 8 bit cable 144 corresponds to the current row position in the grid or matrix being generated as indicated by the 8 bits of digital information on the 8 bit cable 140, the digital comparator 104 will produce an "equals" signal on the conductor 148.

In similar manner, lateral acceleration as measured by an accelerometer as indicated by the block 116 annotated lateral accelerometer is provided as an analog signal on the conductor 156 to the A-D converter 110. The same form of accelerometer described in connection with block 114 may be employed for the lateral accelerometer or alternatively other conventional forms of accelerometers may be employed.

The A-D converter 110 may take the same form as the A-D converter 108 and acts in the well known manner to provide an 8 bit digital signal on the 8 bit cable 146 corresponding to a digital representation of the analog level on conductor 156 whenever the same is gated on by a Convert pulse on conductor 160. Thus, for instance, both the A-D converter 108 and 110 may be formed by ADC0801 8 bit A-D converter modules such as available from National Semiconductor. The Convert input or gating signal provided to the A-D converter 110 is supplied once per frame by the video Sync signal present on the conductor 160. Thus, once per frame an 8 bit digital representation of the lateral acceleration forces on the vehicle due to the driver's action is provided to the digital comparator 106 through the 8 bit cable 146. This signal, as will be readily appreciated by those of ordinary skill in the art, will correspond in magnitude to a position along the abscissa of the diagrams illustrated in FIGS. 2a and 2b and effectively is a resolution of lateral acceleration in the vehicle resolved along the 0°–180° axis.

Thus, the digital comparator 106 receives 8 bits of information on the cable 146 corresponding to the actual lateral g forces imposed on the vehicle by the driver's action resolved along the abscissa on the multiconductor cable 146 and receives current column information or the location along the abscissa on the multiconductor cable 142 corresponding to the actual column position of the 160 by 256 grid or matrix being established. Accordingly, when the actual lateral g forces on the vehicle correspond in magnitude to the row position being generated, the digital comparator 106 will provide an output "equals" signal on the conductor 150.

The output of the digital comparator 104 is applied through the conductor 148 to the pulse stretcher 162 while the output of the digital comparator 106 is applied through the conductor 150 to the pulse stretcher 164. The pulse stretchers 162 and 164 may each take the form of an adjustable one shot such as may be formed by respective halves of a 74HC221 dual one shot such as is available from National Semiconductor. The function of each of the pulse stretchers 162 and 164 is to extend the duration of the pulses provided by the digital comparators 104 and 106 on the conductors 148 and 150 to an extent which is sufficient to present an aesthetically pleasing rectangle on the g—g display which is of sufficient size to appropriately represent current g forces on a display and be readily reviewable by an observer of the display. Thus, typically the duration of the output of the digital comparators 104 and 106 on conductors 148 and 150 will be too short to provide useful information to an observer since the same could correspond to 125 nanoseconds.

Under these circumstances, it will be appreciated that stretching the duration of the output is necessary to enable the vector information to be perceived and provide useful information of the type illustrated by the rectangle 136 in FIG. 2b. The output of the one-shot pulse stretchers 162 and 164 are applied respectively to the conductors 166 and 168. It will be appreciated by those of ordinary skill in the art that once the output of either of the digital comparators 104 and 106 goes high to toggle the one shot 162 or 164, the high at the output of the pulse stretchers on conductors 166 and 168 will go high and stay high for the adjustable timeout durations thereof.

The output of each of the pulses stretchers 162 and 164 are connected through the conductors 166 and 168 to respective inputs of the AND gate 170. The AND gate 170 may take any of the conventional forms of this well known class of device and acts in the conventional manner to provide an output on the conductor 172 only when both of the inputs thereto on conductors 166 and 168 are high. Hence the AND logic function performed by the AND gate 170 will produce an output on the conductor 172 corresponding to the ordinate and abscissa positions of information provided by the fore and aft accelerometer 114 and the lateral accelerometer 116. The output of the AND gate 170 on conductor 172 is applied to the OR gate 16 illustrated in FIG. 1 for application to the Video Module 2. This output, as will now be appreciated by those of ordinary skill in the art, is employed to generate the rectangular representation 36 illustrated in FIGS. 2a and 2b indicative of the current g forces on the vehicle.

Figure 5:
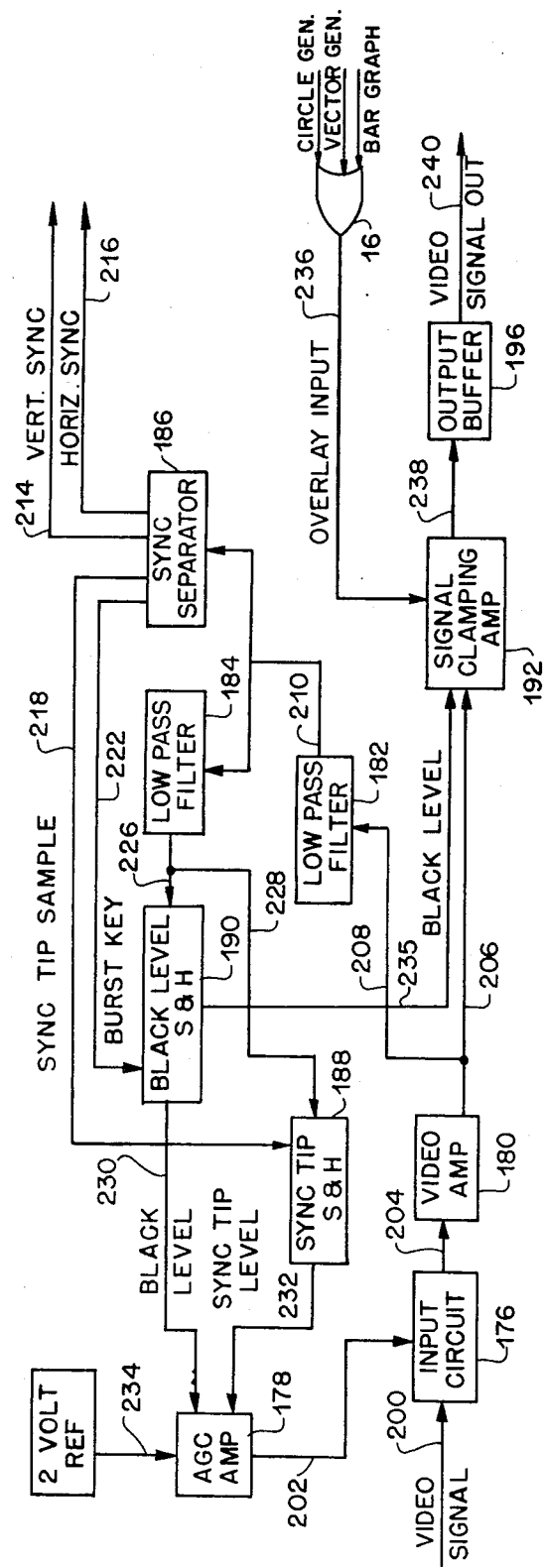
FIG. 5 is a block diagram of an exemplary Video module suitable for use in the embodiment of the invention illustrated in FIG. 1.

Turning now to FIG. 5, there is shown a block diagram of an exemplary Video Module suitable for use in the embodiment of the invention illustrated in FIG. 1. The exemplary video module illustrated in FIG. 5 comprises a video input circuit 176, an automatic gain control amplifier 178, a video amplifier 180, low pass filters 182 and 184, a sync separator 186, a sync tip sample and hold circuit 188, a black level sample and hold circuit 190, a signal clamping amplifier 192, and an output buffer 186 forming the video amplifier/sync separator/mixer module.

The video input circuit 176 may be formed by a load resistor, coupling capacitor, clamping diode and a shunt photoresistor/light emitting diode unit. The video signal as developed by the video camera input 10 illustrated in FIG. 1 is supplied to the video input circuit 176 through the conductor 200 as indicated. This signal, as shall be seen in greater detail below, is gain controlled, clamped and scaled to include its maximum (white) signal approximately equal to a logic one voltage and its minimum video (black) signal approximately equal to a logic zero voltage. Once thus conditioned the video signal is fed to the output buffer 196 together with any overlay input supplied to the Video Module 2 from the OR gate 16 as illustrated in FIG. 1.

The video input circuit 176 also receives an input on conductor 202 from the automatic gain control amplifier 178. This input from the automatic gain control amplifier 178 serves to maintain the input voltage of the video signal present on conductor 200 at the required level. The automatic gain control amplifier may take the form of a conventional operational amplifier (Op Amp) and LED-photoresistor pair as available, for instance, as a VTL2C4 "Vactrol" chip from Vactec.

The output of the video input circuit 176 is applied through the conductor 204 to the video amplifier 180. The video amplifier 180 preferably takes the form of an operational amplifier having a non-inverting closed-loop gain of 15. A typical op-amp for this purpose is the HA2540 operational amplifier from Harris Corporation. The output of the video amplifier 180 is supplied through conductors 206 and 208 to the signal clamping op-amp 192 and the low pass filter 182. The low pass filter 182 preferably takes the form of a unity gain, non-inverting, operational amplifier 2 pole filter whose output is supplied through conductor 210 to the input of the sync separator 186 as well as to the low pass filter 184. The low pass filters 182 and 184 may be formed using op-amps such as the LF353 dual Op Amp National Semiconductor wherein one half of the chip forms each of low pass filters 182 and 184.

The sync separator 186 takes the form of an RC filter and comparator as well as a dual One Shot. The comparator may take the form of an LM319 dual comparator chip such as available from National Semiconductor while the dual One Shot may take the form of a 74HC221 dual One Shot chip also available from National Semiconductor. In essence, the output of the low pass filter on conductor 210 as applied to the sync separator 186 is applied through a capacitor and clamp diode to a comparator which acts in the conventional manner to separate out the Composite Sync. This signal is then integrated in the low pass RC filter within the sync separator 186 and vertical sync is separated by a second comparator and applied to the conductor 214. One of the One Shots present within the sync separator 186 is triggered by the Composite Sync signal and exhibits a 45 microsecond period. This yields, as will be readily appreciated by those of ordinary skill in the art, a Horizontal Frequency signal which is applied to conductor 216. The Horizontal Frequency signal thus produced on conductor 216 in the manner indicated in FIG. 5 has the advantage of being unaffected by equalization pulses.

A further One Shot present within the sync separator 186 is triggered by the leading edge of the Composite Sync signal. This One Shot has a 4 microsecond period or duty signal and the output thereof is applied to conductor 218 for purposes of controlling the Sync Tip Sample-And-Hold circuit 188. A further One Shot within the sync separator 186 is triggered by the trailing edge of the Composite Sync (along with a noise gate signal) and has a period of 3.5 microseconds, which encompasses the color burst period. This Burst Key signal is applied to conductor 222 to the back level sample and hold circuit wherein the same is utilized to sample the average black level of the video signal during the burst period.

The input to the black level sample and hold circuit 190 is supplied on conductor 226 from the second low pass filter 184. The second low pass filter 184 may again take the form of a two pole non-inverting operational amplifier low pass filter fed through the first low pass filter 182 over conductor 210. The output of the second low pass filter 184 is also supplied through conductor 228 to the input of the Sync Tip sample and hold circuit 188.

The output of the black level sample and hold circuit 190 is supplied through conductor 230 to the automatic gain control amplifier 178. Similarly, the output of the Sync Tip sample and hold circuit 188 is applied through conductor 232 to an input of the automatic gain control amplifier 178. A two volt reference voltage is also applied to the automatic gain control amplifier 178 through conductor 234. The difference between the sampled and held black level and the sampled and held Sync Tip level is obtained from the operational amplifier as aforesaid within the automatic gain control amplifier 178. The black level to sync Tip level difference is compared to the two volt reference and the error is amplified and applied through conductor 202 to the input circuit 176 to drive the photoresistor/LED unit therein to control current through the LED and hence to keep the input voltage at the required level. Those of ordinary skill in the art will appreciate that when the black level-sync tip difference is held at 2 volts, the standard white signal level will remain at 5 volts. Thus, when the Sync Tip level (−40 IRE units) is −2 volts, then +100 IRE units will be 5 volts.

The output of the video amplifier 180 representing the conditioned video signal, as aforesaid, which is gain controlled and scaled, is applied through the conductor 206 to the signal clamping amplifier 192. The signal clamping amplifier 192 also receives an input on conductor 235 representing the output of the black level sample and hold circuit 190. The signal clamping amplifier may take the conventional adder/subtractor amplifier form using an op-amp such as the Harris HA2542 as available from the Harris Corporation. The signal amplifier 192 preferably has a unity gain and the black reference level applied thereto on conductor 235 is subtracted from the video signal applied on conductor 206. This, as will be readily appreciated by those of ordinary skill in the art, effectively clamps the black level exactly to ground making the white level 5 volts.

An override input as indicated on conductor 236 may also be applied to the clamping operational amplifier 192 from the OR gate 16. The signals applied to the OR gate 16 illustrated in FIG. 5 correspond to the signals produced by the Circle Generator 4, the Vector Generator 6 and when employed the Bar Graph Generator 8 illustrated in FIG. 1 and indicated as inputs to the OR gate 16 illustrated in FIG. 5. The override provided as an overlay input on the conductor 236 is preferably supplied through the OR gate 16 so that its levels vary exactly between 0 and 5 volts. A logic One will therefore drive any video signal in the visible field to at least 5 volts and allows white graphical data to be superimposed on the video picture in the manner illustrated in FIGS. 2a and 2b. While not illustrated in FIG. 5, a 5 volt clipping circuit may also be employed at the output of the signal clamping amplifier 192 connected to conductor 238 to eliminate any overdriving which may result from an override signal applied to conductor 236. The output of the signal clamping amplifier 192 is applied through the conductor 238 to the output buffer 196. Thus, this signal on conductor 238 represents a composite of the video signal applied to the conductor 200 by the video camera, and overlay information supplied through the OR gate 16 to the conductor 236 by the Circle Generator 4, the Vector Generator 6 and the Bar Graph Generator 8.

The output of the signal clamping amplifier 192 on conductor 238 is supplied to the output buffer 196. The output buffer 196 may take the conventional form of an HA5033 video buffer such as is available from Harris Corporation and is employed as indicated in FIG. 6 to provide a composite output signal on the conductor 240 for application to a video tape recorder, monitor or transmitter. The output of the output buffer 196 on the conductor 240 thus represents the composite g—g diagram illustrated in FIGS. 2a and 2b.

Referring now to FIG. 6, there is shown a block diagram of an exemplary Bar Graph Generator suitable for use in the embodiment of the invention shown in FIG. 1 for generating the brake and accelerator bar graph information illustrated in FIG. 2b. As was stated above, use of the Bar Graph Generator illustrated in FIG. 6 within the instant invention is optional. However, the same, when coupled with the video camera image of the steering wheel position, provides the user of the video g—g display provided herein with a total picture of each of the three driver inputs which establish the g forces on the vehicle as illustrated by the rectangle 36 in FIGS. 2a and 2b.

The exemplary embodiment of the Bar Graph Generator illustrated in FIG. 6 comprises row and column counters 250 and 252, a digital comparator 254, a multiplexer 256, a sample and hold circuit 258 and an A-D converter 260. The row and column counters 250 and 252 may take precisely the same form as the row and column counters 100 and 102 illustrated in FIG. 4 with the single exception as to be described in greater detail below that the output of the row counter is decoded. As such, those of ordinary skill in the art will appreciate that the row and column counters 250 and 252 are employed to form a 12 by 256 grid or matrix upon which the information generated by the Bar Graph Generator illustrated in FIG. 6 is superimposed upon the video information supplied to the Video Module 2 from the video camera to form a composite image.

Accordingly, as will now be apparent from the description of FIG. 4, the row counter 250 receives horizontal sync pulses from the Video Module 2 on the conductor 262 which are applied to the count input thereof. Similarly, vertical sync pulses from the Video Module 2 are applied through the conductor 264 to the reset input of the row counter 250 and through the conductor 266 to a position One Shot 268 so that, upon the expiration of the timeout duration of the one shot 268 the row counter 250 is enabled to begin its counting cycle by the trailing edge of the pulse produced by the one shot 268 on conductor 270. Thus, the row counter 250 and the position one shot 268 may take the same form described in connection with FIG. 4 except that the row counter need only count to 12, thus only a 4 bit counter is employed here. Similarly, the column computer 252 receives clock pulses to be counted at the count input thereof connected to conductor 272 as generated by an 8.5 megahertz (nominal frequency) oscillator 274. Horizontal sync pulses generated by the Video Module 2 are supplied directly to the reset input of the column counter 252 on conductor 276 while the horizontal sync pulses are additionally applied to a position one shot 278. The position one shot 278 acts to insert an appropriate delay and thereafter enable the column counter 252 by an output produced on the conductor 280 so that, as was explained in connection with FIGS. 3 and 4, the grid or matrix formed is appropriately positioned on the display. The column counter 252, the 8.5 megahertz oscillator 274 and the position one shot 278 may take precisely the same form as described in connection with the correspondingly designated devices 102, 120 and 132 described in connection with FIG. 4.

The column counter 252 produces an 8 bit output on the cable 282 corresponding to the current state of the count therein to thereby define 256 columns. The row counter and decoder 250 may take precisely the same form of device described in connection with the row counter illustrated in FIG. 4 if the 8 bit output thereof were subsequently decoded to produce appropriately defined outputs for lines 0–12. An alternate approach which was here employed was to utilize one half of a 74HC4520 dual 4 bit binary counter such as available from RCA, together with a 74HC86 exclusive OR gate and a 74HC132 quad 2 input NAND gate Schmitt trigger to establish the combination device. Thus here the outputs for rows 0–12 in terms of rows 2 and 3, 4–7, 10 and 11, and 12 are decoded directly. In addition, as indicated by the conductor 284, once a row 12 output is decoded it is tied back to the inhibit of the row counter 250 to hold the count thereof at 12 until such time as the row counter 250 is again reset by the presence of a vertical sync pulse on the conductor 264.

The output of the row counter 250 corresponding to count 4–11 is applied through cable 285 to address multiplexer 256. The output of the row counter 250 corresponding to a count 4–7, and count 12 row positions is applied through the cable 286 as parallel inputs to the Sample input of the sample and hold circuit 258 and the Convert input to the A–D converter 260. Similarly, the decoded count 2, 3, 10 and 11 outputs of the row counter 250 are applied to the conductor 288 so that during the presence of these rows of the grid or matrix established a high will reside on the conductor 288. Thus, those of ordinary skill in the art will appreciate that during the presence of lines 2 and 3, 10 and 11 a high will reside on conductor 288 and hence one input to the AND gate 290. Similarly, during the presence of lines 4–7 and line 12, a high will be applied to the conductor 286 and during the presence of lines 4–11 a high will be applied to the conductor 285.

The AND gate 290 may take any of the conventional forms of this well known class of device which acts to produce a high at the output thereof on conductor 292 whenever both of the inputs thereto are high. Those of ordinary skill in the art will also appreciate that a high at the output of the AND gate 290 will represent a white level when the same is applied to OR gate 16 and as an overlay input to the signal clamping amplifier 192 illustrated in FIG. 5. A second input to the AND gate 290 is supplied on conductor 294 from the output of the flip-flop 296. The flip-flop 296 may comprise one half of a 74HC74 dual D flip-flop which acts in the conventional manner to produce a high at the output thereof connected to conductor 294 whenever a high is applied at the set input thereto on conductor 298. It will again assume a low output condition on conductor 294 when a reset level is supplied to the reset input thereof connected to conductor 300. The set input to the flip-flop 296 connected to conductor 298 is connected to the output of the position One Shot 278 so that the flip-flop 296 is set at the same time the column counter 252 begins counting pulses from the 8.5 megahertz oscillator 274. The reset input to the flip-flop 296 is connected through the conductor 300 to the output of the digital comparator 254.

The digital comparator 254 may take any of the conventional forms of this well known class of device which acts to produce an output on the conductor 300 whenever each of the inputs thereto correspond. Thus, the digital comparator 254 may take the form of a 74HC688 8 bit magnitude comparator such as is available from National Semiconductor and employed in connection with FIG. 4. The 8 bit input to the digital comparator 254 provided on the cable 282 corresponds as aforesaid to the current column count.

The second input to the digital comparator 254 is provided through the cable 302 from the output of the analog to digital converter 260. The sample and hold circuit 258 and the A–D converter 260 are each commonly controlled by a high level present on the conductor 286 in response to a count condition of the row counter 250 corresponding to the presence of horizontal rows 4–7 and 12. The multiplexer 256 is addressed through the conductor 285 and may take any of the conventional forms of this well known class of device. For instance, an IH5043 analog switch as available from Intersil may be employed to form a 2 input, single output multiplexer device. One input to the multiplexer 256 is provided from an accelerator position transducer 304 while a second input to the multiplexer 256 is provided from a brake effort transducer 306. In essence, any of the well known forms of pressure or position transducers may be employed to measure the position of the throttle or accelerator and the effort applied to the brake as measured by the transducers 304 and 306 and the output of each device is separately applied to the multiplexer 256. The multiplexer 256 acts in the conventional manner to apply either of the inputs 304 or 306 to the single output thereof as a result of a new switch input applied on the conductor 285. Hence, when conductor 285 goes low in response to the presence of lines 0–3 or 12, the accelerator position input 304 will be gated through to the output thereof while when line 285 goes high, in response to the presence of lines 4–11, the brake effort transducer output by the device 306 will be supplied to the output of the multiplexer 256.

The output of the multiplexer 256 is applied to the sample and hold device 258 when the sample input thereto connected to conductor 286 goes high and is held at the output thereof until a new sampling by the device occurs. Thus the sample and hold circuit 258 may take the conventional form of an LF398 sample and hold circuit as available from National Semiconductor. During the presence of line 12 the accelerator position information at the output of multiplexer 256 will be sampled. This information will be held for the duration of lines 0–3. When the conductor 286 goes high for line 4 the output of the brake effort transducer 306 as now present at the output of the multiplexer 256 is sampled. This information is held through lines 8–11.

The output of the sample and hold circuit 258 is applied to the A–D converter 260 which acts to convert the analog input supplied thereto by the sample and hold circuit 258 to an 8 bit digital value in response to the appearance of a low level at the convert input thereto connected to the conductor 286. Thus, during the presence of horizontal rows 0–3, the analog value representing the accelerator position held by the sample and hold circuit 258 is converted into an 8 bit value and applied in parallel through the cable 302 to the digital comparator 358. Similarly, during lines 8–11 the value of the analog signal representing the brake effort transducer 306 is held by the sample and hold circuit 258, is converted into an 8 bit digital value and applied to the digital comparator 254 via the cable 302.

In operation the exemplary Bar Graph Generator illustrated in FIG. 6 presents a throttle and brake bar graph as illustrated by the bar graphs 48 and 50 in FIG. 2b. This is done in a manner which is similar to the generation techniques employed by the Circle and Vector Generators illustrated in FIGS. 3 and 4 although the generation which here takes place occurs independently. For a pleasing visual appearance, each bar 48 and 50 as illustrated in FIG. 2b is 2 horizontal scan lines wide and separated by 6 horizontal scan lines and all 256 grid columns are employed. The result is a pair of 2 line wide white horizontal bars starting near the left of the video screen, having a length proportional to the amount of throttle and/or brake effort applied.

More particularly, the row counter 250 is reset by the once per frame vertical sync pulse produced on conductor 266. It is held in this condition until enabled upon the completion of the time out of the position one shot 268 which acts as aforesaid to position the 12 by 256 grid or matrix on the screen. In a corresponding manner, the column counter 252 is reset by the horizontal sync pulse which is present on conductor 276 and is held in this condition until subsequently enabled upon the termination of the duty cycle of the position One Shot 278 and the application of the enable level on the conductor 280. When enabled, the column counter 252 immediately begins counting the 256 clock pulses which are produced for each row by the oscillator 274, it being noted that the same high level which is produced on conductor 280 to enable the column counter 252 acts to set the flip-flop 296 producing a high output on the conductor 294 to the AND gate 290. When the row counter 250 begins counting, the presence of line 0 will cause a low to be produced at the output thereof on conductor 285. This causes the accelerator position information produced by the transducer 304 to be applied to the output of the multiplexer 256. This value is sampled and held by the sample and hold circuit 258 and is converted into an 8 bit digital value by the A-D converter 260.

When the state of the row counter 250 advances to lines 2 and 3, the high level output thereof on conductor 288 will cause the output of the AND gate 290 to reflect the level of the conductor 294. Since the flip-flop 296 is set by the horizontal sync pulse which is produced once each time a row occurs, as delayed by the position one shot 278, it will be seen that the output of the AND gate 290 will go high from the beginning column position of the 12 by 256 grid for the horizontal line 2 and will remain high until the flip-flop 296 is reset by the output of the digital comparator 254 on the conductor 300. This will occur, however, when the accelerator position transducer information as digitized and applied to the 8 bit cable 302 corresponds to the current column position provided to the digital comparator 254 from the column counter 252 on the 8 bit cable 282. Thus for line 2 a white bar resulting from the high output of the AND gate 290 on conductor 292 will be initiated at the line 2 column 0 position of the grid. The same will remain high or be continued as a white bar until the column position indicated by the column counter 252 corresponds to the accelerator position information applied in digital form on the cable 302. At this point the flip-flop 296 will be reset causing the input on conductor 294 to go low and the output of the AND gate 290 on 292 to go low or to a black level. Precisely the same function will result for line 3 so that a bar 48 having a width of 2 horizontal line rows will be initiated at the column 0 position for rows 2 and 3 and will be continued until the actual accelerator position information corresponds to the column counter.

When line 3 terminates and a horizontal sync pulse corresponding to horizontal row 4 is counted the brake effort transducer input will be gated to the output of the multiplexer 256 due to the presence of a high for row 4 on the conductor 285. Of course, at the end of line 3 the input on conductor 288 will go low causing the output of the AND gate 290 on conductor 292 to be low. As a result of the high on the conductor 285, the analog signal produced by the brake effort transducer 306 is gated to the output of the multiplexer 256, sampled by the sample and hold circuit 258 and converted into an 8 bit digital signal by the A-D converter 260 so that the same is applied through the cable 302 to one input of the digital comparator 254. The flip-flop 296 will be set and reset for each of rows 4-9, however, all during this period the input on conductor 288 stays low so that the output of the AND gate 290 remains low.

Upon the occurrence of rows 10 and 11, however, the conductor 288 again goes high. Under these conditions, when the flip-flop 296 is set by the delayed horizontal sync input applied to the position One Shot 278, the output of AND gate 290 on conductor 292 will go high and remain high to generate a white bar in the manner indicated by 50 in FIG. 2b from the 0 column position until such time as the actual column count, produced by the column counter 252, corresponds to the brake pressure as presented in digital form on the cable 302 to the digital comparator 254.

At this time, the flip-flop 296 is reset causing the output of AND gate 290 on conductor 292 to go low. This again will be repeated for line 11. Thereafter, for the remainder of the frame, the line input on conductor 288 will be low so that a black or low level will be continuously output by the AND gate 290 on the conductor 292. The output of the AND gate 290 on conductor 292 is applied through the OR gate 16 to the signal clamping amplifier 192 in FIG. 5 as an overlay input. Thus, in the same manner explained for the Circle Generator and Vector Generator, the presence of a high level at the output of the Bar Graph Generator illustrated in FIG. 6 will cause the Video Module illustrated in FIG. 5 to produce a composite video output on the conductor 240 which includes not only the video signal measured by the camera but the overlay input generated thereby the respective ones of the Circle Generator, Vector Generator and Bar Graph Generator to yield a composite video g—g diagram as illustrated in FIG. 2b.

The driver vehicle behavior display apparatus set forth herein is highly advantageous in that it allows the presentation in real time of the friction circle associated with a vehicle under test as well as a vector diagram indicating the forces to which the vehicle is being subjected by driver inputs in the form of the position of the steering wheel, the position of the accelerator or throttle and the force on the brake. In addition, observable indicia associated with each of the inputs may be presented within the composite g—g diagram in that the position of the steering wheel is shown and bar graphs defining the accelerator position and brake pressure may be employed as well.

Those of ordinary skill in the art will recognize that while this invention has been set forth in connection with relatively specific exemplary embodiments which employ specific integrated circuits and configurations therefor, alternate configurations and circuit designs employing different integrated circuits or discrete components may be used as well. This is particularly so where special applications of the instant invention require specialized features or have resolution requirements which differ from the generalized embodiment set forth herein.

Thus, although the instant invention has been described in connection with a highly specific exemplary embodiment thereof, it will be understood that many modifications and variations thereof will be readily apparent to those of ordinary skill in the art. Therefore, it is manifestly intended that this invention be only limited by the claims and the equivalents thereof.

What is claimed is:

1. Driver-vehicle behavior display apparatus comprising:
   means for receiving video signals corresponding to a driver's view of a course to be traversed;
   means for generating first video information signals corresponding to a graphical representation of a vehicle's capabilities;
   means for generating second video information signals corresponding to a vector representation of g forces imposed upon a vehicle by a driver; and means for combining in real time said received video signals, said first video information signals and said second video information signals to form a real time composite video signal displayable as a g—g diagram superimposed upon said driver's view of said course to be traversed.

2. The driver-vehicle behavior display apparatus according to claim 1 wherein said video signals corresponding to a driver's view of a course to be traversed additionally includes steering wheel position information.

3. The driver-vehicle behavior display apparatus according to claim 1 additionally comprising means for generating third video information signals corresponding to a graphical indication of accelerator position and brake pressure and wherein said means for combining additionally acts to combine said third video information signals with said received video signals and said first and second video information signals to form a real time composite video signal, said real time composite video signal being displayable as a g—g diagram superimposed upon said driver's view of said course to be traversed and having graphical indications of accelerator position and brake pressure overlayed thereon.

4. The driver-vehicle behavior display apparatus according to claim 1 wherein said means for receiving includes video amplifier and sync separator means and said means for combining includes mixer means.

5. The driver-vehicle behavior display apparatus according to claim 1 wherein said means for generating first video information signals corresponding to a graphical representation of a vehicle's capabilities includes means for generating an overlay matrix and means for reading digital information for each position in said overlay matrix.

6. The driver-vehicle behavior display apparatus according to claim 5 wherein said means for reading includes read only memory means having a bit location therein for each position in said overlay matrix, said read only memory means having a first logic level stored in bit locations therein corresponding to positions in said overlay matrix where the visual graphical representation of a vehicle's capabilities is to be provided and a second logic level stored in bit locations therein corresponding to positions in said overlay matrix where no visual graphical representations of the vehicle's capabilities is to be provided.

7. The driver-vehicle behavior display apparatus according to claim 6 wherein said means for reading further includes means for reading out said read only memory means at a rate corresponding to the appearance of portions of said video signals corresponding to a driver's view of a course to be traversed on which said first video information signals corresponding to graphical representations of a vehicle's capabilities are to be overlayed.

8. The driver-vehicle behavior display apparatus according to claim 7 wherein said graphical representation of a vehicle's capabilities corresponds to a plot wherein lateral and fore/aft g forces are resolved along the abscissa and ordinate.

9. The driver-vehicle behavior display apparatus according to claim 1 wherein said means for generating second video information signals corresponding to a vector representation of g forces imposed upon a vehicle by a driver includes means for generating an overlay grid and means for inserting measured fore/aft and lateral g forces at locations within said grid corresponding to the magnitude and directions of g forces measured.

10. The driver-vehicle behavior display apparatus according to claim 9 wherein said overlay grid includes discrete rows and columns and wherein said magnitudes of fore/aft and lateral g forces are indicated respectively in row and column directions and the directions of said fore/aft and lateral g forces are indicated respectively in column and row directions.

11. The driver-vehicle behavior display apparatus according to claim 10 wherein said means for generating second video information signals additionally includes means for establishing a resultant vector representation of fore/aft and lateral g forces inserted at locations within said grid and reading said resultant vector representation established at a rate corresponding to the appearance of portions of said video signals corresponding to a driver's view of a course to be traversed on which said second video information signals are to be overlayed.

12. The driver-vehicle behavior display apparatus according to claim 4 wherein said mixer means takes the form of a signal clamping amplifier for receiving a reference level, the video signals corresponding to a driver's view of a course to be traversed which have been referred to said reference level and said first and second video information signals in digital form.

13. The driver-vehicle behavior display apparatus according to claim 12 wherein said video amplifier and sync separator means act to establish maximum white level information in said video signals corresponding to a driver's view of a course to be traversed at a first logic level and black level information in said video signals corresponding to a driver's view of a course to be traversed at a second logic level.

14. The driver-vehicle behavior display apparatus according to claim 13 wherein said reference level corresponds to said second logic level.

15. The driver-vehicle behavior display apparatus according to claim 14 wherein said first and second video information signals in digital form correspond in magnitude to said first and second logic levels.

16. The driver-vehicle behavior display apparatus according to claim 3 wherein said means for generating third video information signals corresponding to a graphical indication of accelerator position and brake pressure includes means for generating rows and columns of an overlay frame and means for imposing measured accelerator position and brake pressure data in particular ones of said rows of said overlay frames.

17. The driver-vehicle behavior display apparatus according to claim 16 wherein the magnitude of said measured accelerator position and brake pressure data in particular ones of said rows is indicated in said column direction.

18. The driver-vehicle behavior display apparatus according to claim 4 wherein said means for generating first video information signals corresponding to a graphical representation of a vehicle's capabilities includes means for generating an overlay matrix and means for reading digital information for each position in said overlay matrix.

19. The driver-vehicle behavior display apparatus according to claim 18 wherein said means for generating second video information signals corresponding to a vector representation of a g force imposed upon a vehicle by a driver includes means for generting an overlay grid and means for inserting measured fore/aft and lateral g forces at locations within said grid corresponding to the magnitude and direction of g forces measured.

20. The driver-vehicle behavior display apparatus according to claim 19 additionally comprising means for generating third video information signals corresponding to a graphical indication of accelerator position and brake pressure and wherein said means for combining additionally acts combine said third video information signals with said received video signals and said first and second video information signals to form a real time composite video signal, said real time composite video signal being displayable as a g—g diagram superimposed upon said driver's view of said course to be traversed and having graphical indications of accelerator position and brake pressure overlayed thereon.

21. The driver-vehicle behavior display apparatus according to claim 19 wherein said mixer means takes the form of a signal clamping amplifier for receiving a reference level, the video signals corresponding to a driver's view of a course to be traversed which have been referred to said reference level and said first and second video information signals in digital form.

22. The driver-vehicle behavior display apparatus according to claim 21 wherein said video amplifier and sync separator means act to establish maximum white level information in said video signals corresponding to a driver's view of a curse to be traversed at a first logic level and black level information in said video signals corresponding to a driver's view of a course to be traversed at a second logic level.

23. The driver-vehicle behavior display apparatus according to claim 22 additionally comprising means for generating third video information signals corresponding to a graphical indication of accelerator position and brake pressure and wherein said means for combining additionally acts to combine said third video information signals with said received video signals and said first and second video information signals to form a real time composite video signal, said real time composite video signal being displayable as a g—g diagram superimposed upon said driver's view of said course to be traversed and having graphical indications of accelerator position and brake pressure overlayed thereon.

24. The driver-vehicle display apparatus according to claim 22 wherein said means for reading includes read only memory means having a bit location therein for each position in said overlay matrix, said read only memory means having a first logic level stored in bit locations wherein corresponding to positions in said overlay matrix where a visual graphical representation of the vehicle's capabilities is to be provided and a second logic level stored in bit locations therein corresponding to positions in said overlay matrix where no visual graphical representations of the vehicle's capabilities is to be provided.

25. The driver-vehicle behavior display apparatus according to claim 24 wherein said overlay grid includes discrete rows and columns and wherein said magnitudes of fore/aft and lateral g forces are indicated respectively in row and column directions and the directions of said fore/aft and lateral g forces are indicated respectively in column and row directions.

26. The driver-vehicle behavior display apparatus according to claim 25 wherein said means for reading further includes means for reading out said read only memory means at a rate corresponding to the appearance of portions of said video signals corresponding to a driver's view of a course to be traversed on which said first video information signals corresponding to graphical representations of a vehicle's capabilities are to be overlayed.

* * * * *